United States Patent [19] [11] 3,768,800
Gutknecht [45] Oct. 30, 1973

[54] APPARATUS FOR STACKING A SHEET-LIKE FLEXIBLE MATERIAL
[75] Inventor: Heinrich Gutknecht, Broodakker, Netherlands
[73] Assignee: N. V. Veluwse Machine Industrie
[22] Filed: Jan. 13, 1972
[21] Appl. No.: 217,487

[52] U.S. Cl. .................. 270/30, 270/62, 270/79
[51] Int. Cl. ............................................ B65h 29/46
[58] Field of Search .......................... 270/30–31, 61, 79, 82, 85

[56] References Cited
FOREIGN PATENTS OR APPLICATIONS
1,141,610  10/1954  Germany ..................... 270/30

Primary Examiner—Robert W. Michell
Assistant Examiner—A. Heinz
Attorney—S. Delvalle Goldsmith et al.

[57] ABSTRACT

This invention relates to an apparatus for stacking a continuous web of material in a continuous zigzag condition or as sheets cut by the apparatus, said apparatus comprising an endless conveyor belt guided around rollers and mounted in a carriage which can be reciprocated horizontally between two end positions, the rollers being mounted in the frame of the apparatus in such a way that a belt loop which is located between the forwardly moving part and the backwardly moving part of the belt is shortened when the carriage makes its outward stroke and resumes its original length when the carriage makes its return stroke. A freewheel coupling allows rotation of the foremost carriage roller and the rear frame roller only in one direction, and a driving system reciprocates the carriage which takes with it the conveyor belt and a cutting means to cut the web, when in an operative condition, at the end of each return stroke of the carriage so that when the cutting means is operative web pieces of equal length are cut off and stacked and when the cutting means is not operative the web is zigzag folded and stacked. A clamp engages the conveyor belt when the cutting means is not operative during the outward stroke so that said belt is moved with respect to the carriage and material is deposited during the outward stroke.

3 Claims, 8 Drawing Figures

APPARATUS FOR STACKING A SHEET-LIKE FLEXIBLE MATERIAL

The present invention relates to an apparatus for stacking a sheet-like flexible material.

Apparatus of the type which supply and stack individual sheets of predetermined length one after another is known. In such apparatus the supply of the individual sheets is generally by means of a conveyor belt. Further, apparatus is known in which the material is in the form of a continuous web and the web is folded and stacked in a zigzag fashion. In the latter apparatus no individual sheets are used.

The present invention provides an apparatus which is able, in dependence on the operational adjustment of the apparatus, to cut and stack individual material sheets from a continuous web of the material or to fold and stack the continuous material web in a zigzag fashion without cutting the web into individual sheets.

According to the present invention apparatus for stacking a flexible material received by the apparatus in the form of a continuous web, comprises a conveyor belt, first and second parallel rollers supporting said belt, a carriage rotatably supporting said rollers in fixed spaced relationship substantially in a horizontal plane, said carriage being arranged for reciprocation substantially in a horizontal direction between first and second end positions, a frame supporting and guiding said carriage, third and fourth rollers rotatably mounted in fixed spaced relationship to said frame parallel to said first and second rollers and supporting said belt, a portion of said belt extending from said third roller to said first roller to support and carry the web, the remainder of the belt extending from the first roller partially round the second roller and the fourth roller back to the third roller whereby tension of the belt is maintained during said reciprocation of the carriage, an actuator connected to cause said reciprocation of said carriage with an outward stroke from said first to said second end position and a return stroke from said second to said first end position, a freewheel coupling for each of the first and third rollers to allow rotation thereof only in a direction which allows movement of said portion of said belt in the direction of the outward stroke, a web cutting means selectively adjustable from an operative to a non-operative condition, a clamp fixed in relation to said frame and operable only when the cutting means is in its non-operational condition to clamp said belt between said first and second rollers to move said belt in the same direction as the carriage during said outward stroke so that the web is conveyed and deposited during the outward stroke, the clamp being arranged to release the belt during the return stroke, and a vertically adjustable stacking platform on which a stack of said material is formed by said reciprocation.

The invention will now be described, by way of example, with reference to the accompanying diagrammatic drawings, in which.

Figure 1:
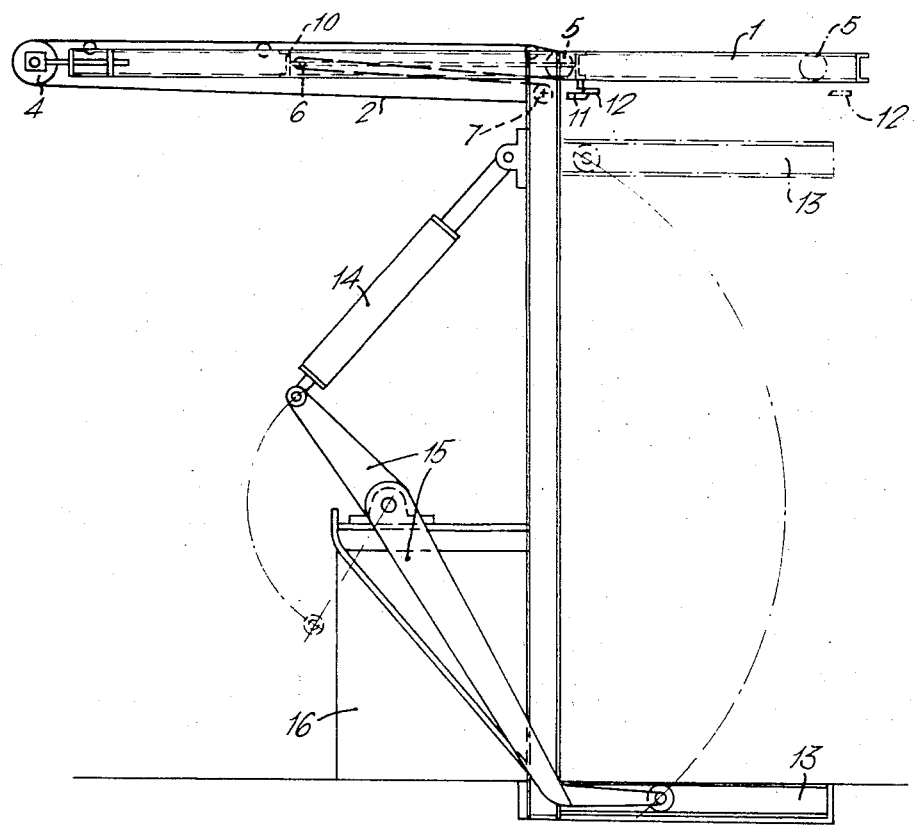
FIG. 1 is a side view of a part of the apparatus.

Referring to the drawings the apparatus comprises a supporting frame 1, an endless conveyor belt 2 for the continuous web of material 3, parallel rotatable guide rollers 4, 5, 6, 7 for the conveyor belt, a hydraulic piston-cylinder system 8, the piston rod 9 of which is coupled to a carriage 10. The carriage 10 can be reciprocated between two end positions (shown in FIG. 2 and 6) by means of said piston-cylinder system 8. The carriage 10 is provided with tempered steel wheels which are guided on tempered steel guides in the frame 1.

First and second of the rollers 5, 6 are rotatably mounted on the carriage 10 in fixed spaced relationship. Third and fourth of the rollers 4, 7 are rotatably mounted to the frame 1.

A cutting mechanism 11 and 12 is provided which comprises a cooperating lower blade 11 and upper blade 12 with the lower blade fastened to the frame and the upper blade fastened to the carriage. The upper blade is angled in relation to the lower blade so as to obtain a better shearing action. The lower blade is adjustable in a verticle direction to allow optimum shearing action.

The rollers 4, 5 include a freewheel coupling so that they are rotatable in one direction only.

A lifting platform 13 is arranged for vertical movement in the frame 10 on tempered steel wheels which run on tempered steel guides. The lifting platform is moved vertically by a hydraulic piston-cylinder 14 which engages the lifting platform through a pivoting connecting system.

The required hydraulic fluid under pressure for the cylinders 8, 14 is supplied by a hydraulic pumping unit 16 provided with monitoring and controlling devices. The apparatus is provided with electrical switch devices, so that the apparatus can operate independently or can be connected in series with another machine.

The operation of the apparatus will now be described in the operational state in which the continuous web is cut and the sheets so produced then stacked (FIGS. 2 through 5).

Figure 2:
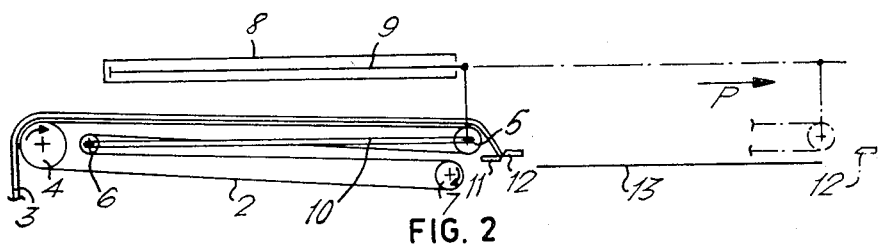
FIG. 2–5 show the apparatus when it cuts pieces from a continuous web of material and stacks same.
Figure 3:
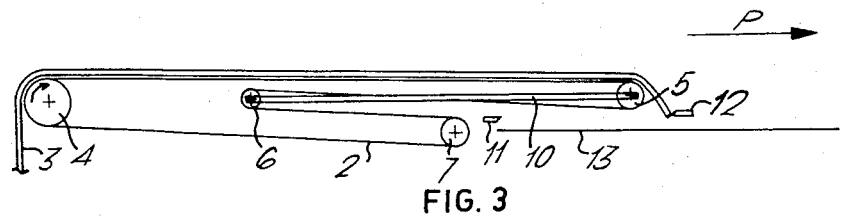

First refer to FIG. 2 in which the web of material 3 extends a short distance beyond the first roller 5. When the cylinder 8 is actuated, the piston rod 9 is moved outwardly. Said rod takes the carriage 10 and, consequently, also the first and second rollers 5, 6 with it in the direction of the arrow P. During this outward stroke of the carriage the conveyor belt 2 is stationary with respect to the carriage with the roller 5 prevented from rotation (in an anti-clockwise direction as seen in the drawings) by its freewheel coupling. The web of material is supported by the uppermost portion of the conveyor belt and is conveyed in the direction of the arrow P. FIG. 3 shows that the length of the loop-shaped portion of the conveyor belt (which portion extends from the first roller 5 about the second roller 6 towards the fourth roller 7 and is located between the forwardly moving belt portion and the backwardly moving belt portion) is reduced during said movement. During the outward stroke the third and fourth rollers 4, 7 are freely rotatable (see arrows).

When the carriage 10 has reached the end of its outward stroke (see dotted lines in FIG. 2) the direction of movement of the piston rod 9 is reversed by means of an end switch (not shown). The carriage is then returned in the direction of the arrow P' (see FIG. 4). During the return stroke the first roller 5 is rotating (see arrow) and the third and fourth rollers 4 and 7 do not rotate, the third roller 4 being prevented from rotation in an anti-clockwise direction as seen in the drawings by its associated freewheel coupling. The carriage is returned from below the web piece 17 which is deposited onto the lifting platform 13 (or onto a pallet which is positioned on said platform). When the operation of the apparatus starts the lifting platform 13 is in its highest position.

At the end of the return stroke (FIGS. 5) the upper blade 12 which is fastened to the carriage 10 cooperates with the lower blade 11 which is fastened to the frame 1 to shear the web piece 17 from the web 3.

A further end switch (not shown) causes the reversal of the movement and the cycle is then repeated. In this way a stack 18 is formed on the lifting platform 13, which stack comprises cut off web pieces 17 all of the same length. The length of each piece corresponds with the stroke length of the carriage 10 and this stroke length is adjustable by adjustment of the operating position of the end switches.

Figure 6:
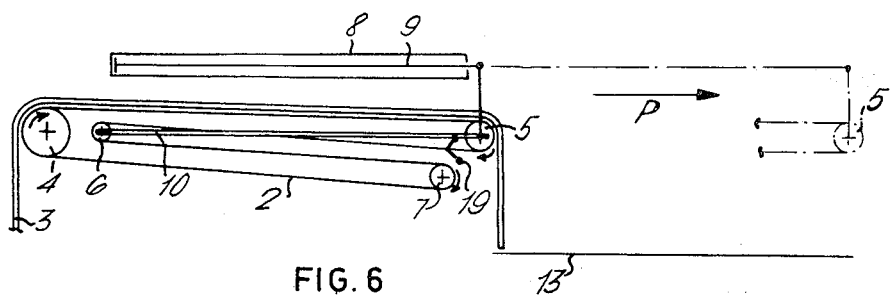
FIGS. 6–8 show schematically the apparatus when it folds and stacks said continuous web of material in a zigzag fashion.
Figure 7:
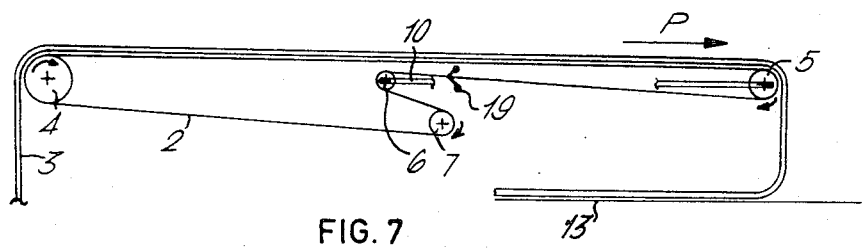
Figure 8:
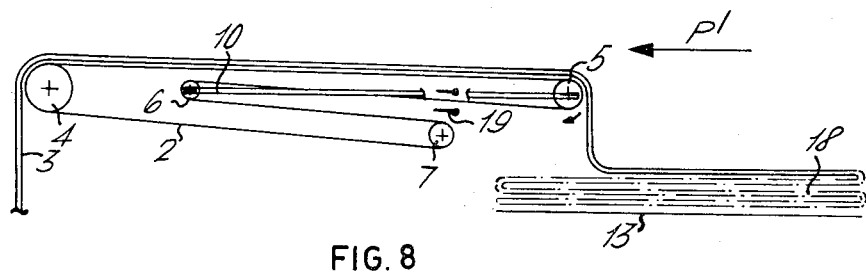

The operation of the apparatus will now be described, with reference to FIGS. 6–8, in the operational state in which the web 3 is folded and stacked in zigzag fashion without being cut.

The carriage 10 makes its outward stroke in a similar way to that represented in FIG. 2. However, the conveyor belt 2 is clamped by a clamp 19 fixed relative to the frame at a point located between said first and second rollers 5 and 6. As a result of this the conveyor belt 2 is moved with respect to the carriage (FIGS. 6 and 7) and web material is deposited onto the platform 13 during said outward stroke (FIG. 7).

Figure 4:
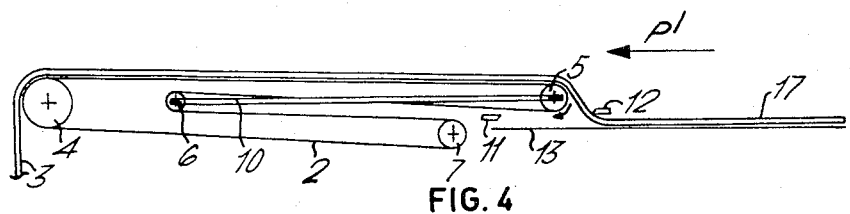
Figure 5:
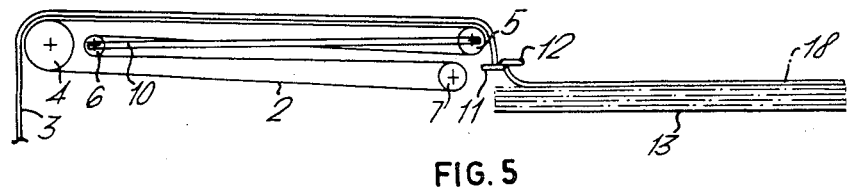

The return stroke (FIG. 8) is similar to that of FIG. 4 with the clamp 19 disengaged. The end switch which sould reverse the movement of the piston-cylinder system 8, 9 is positionally adjusted so that the blades 11, 12 (not shown in FIGS. 6, 7 and 8) do not contact one another during this mode of operation and the web 3 is therefore, not cut into pieces, but is deposited as an endless and zigzag stack (FIG. 8).

When a zigzag stack of a desired size has been produced on the platform, the end switch arrangement is adjusted so that the blades cooperate to cut the web at the end of a return stroke.

Although the operation of the apparatus is not restricted to a certain type of web material the apparatus is particularly suited for folding and stacking sheets and webs of rubber.

The invention is not restricted to the described embodiments, but comprises all variants covered by the claims.

I claim:

1. Apparatus for stacking a flexible material received by the apparatus in the form of a continuous web, comprising a conveyor belt, first and second parallel rollers supporting said belt, a carriage rotatably supporting said rollers in fixed spaced relationship substantialy in a horizontal plane, said carriage being arranged for reciprocation substantially in a horizontal direction between first and second end positions, a frame supporting and guiding said carriage, third and fourth rollers rotatably mounted in fixed spaced relationship to said frame parallel to said first and second rollers and supporting said belt, a portion of said belt extending from said third roller to said first roller to support and carry the web, the remainder of the belt extending from the first roller partially round the second roller and the fourth roller back to the third roller whereby tension of the belt is maintained during said reciprocation of the carriage, an actuator connected to cause said reciprocation of said carriage with an outward stroke from said first to said second end position and a return stroke from said second to said first end position, a freewheel coupling for each of the first and third rollers to allow rotation thereof only in a direction which allows movement of said portion of said belt in the direction of the outward stroke, a web cutting means mounted on said apparatus and selectively adjustable from an operative to a non-operative condition, a clamp mounted on said frame, control means to render said clamp operable only when the cutting means is in its non-operational condition to clamp said belt between said first and second rollers to move said belt in the same direction as the carriage during said outward stroke so that the web is conveyed and deposited during the outward stroke, said control means being arranged to cause said clamp to release the belt during the return stroke allowing a length of web material to be deposited during the return stroke and a vertically adjustable stacking platform on which a stack of said material is formed by said reciprocation.

2. Apparatus according to claim 1, wherein the cutting means comprises a first blade which is fastened to the frame and a second blade which is fastened to the carriage and which, when the cutting means is in operative condition cooperates with the first blade to shear said web at the end of each return stroke of the carriage.

3. Apparatus according to claim 1, wherein said actuator comprises a hydraulic cylinder-piston system, the piston rod of which is coupled to the carriage and comprising end switches at the end of each stroke of the carriage to reverse the direction of movement of the piston rod and the attached carriage.

* * * * *